United States Patent
Mattina

(10) Patent No.: US 10,875,443 B2
(45) Date of Patent: Dec. 29, 2020

(54) CLOSURE ELEMENT FOR CLOSING THE HOUSING OF A HEADLAMP

(71) Applicant: Hella GmbH & Co. KGAA, Lippstadt (DE)

(72) Inventor: Giuseppe Mattina, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 51 days.

(21) Appl. No.: 16/359,503

(22) Filed: Mar. 20, 2019

(65) Prior Publication Data

US 2019/0217767 A1    Jul. 18, 2019

Related U.S. Application Data

(63) Continuation of application No. PCT/EP2017/073100, filed on Sep. 14, 2017.

(30) Foreign Application Priority Data

Sep. 20, 2016   (DE) .......................... 10 2016 117 692

(51) Int. Cl.
*B60Q 1/00*     (2006.01)
*F21S 45/33*    (2018.01)
*B60Q 1/04*     (2006.01)

(52) U.S. Cl.
CPC ........... *B60Q 1/007* (2013.01); *B60Q 1/0466* (2013.01); *F21S 45/33* (2018.01)

(58) Field of Classification Search
CPC ................................ B60Q 1/007; F21S 45/33
See application file for complete search history.

(56) References Cited

U.S. PATENT DOCUMENTS

| | | | | |
|---|---|---|---|---|
| 5,609,407 A | * | 3/1997 | Yanagihara | ......... B29C 45/2628 362/547 |
| 8,734,573 B2 | | 5/2014 | Ono et al. | |
| 2012/0207970 A1 | | 8/2012 | Kamikawa | |

FOREIGN PATENT DOCUMENTS

| | | |
|---|---|---|
| DE | 19632909 A1 | 2/1998 |
| DE | 102004002988 A1 | 8/2005 |
| DE | 202008007238 U1 | 9/2008 |
| DE | 102008062638 A1 | 9/2009 |
| DE | 102009015475 A1 | 9/2010 |
| DE | 102014010650 A1 | 8/2015 |
| DE | 102014118740 A1 | 6/2016 |
| EP | 2455643 A1 | 5/2014 |
| JP | H0668217 U | 9/1994 |
| JP | 2003007131 A | 1/2003 |

(Continued)

OTHER PUBLICATIONS

International Search Report dated Dec. 20, 2017 in corresponding application PCT/EP2017/073100.

*Primary Examiner* — Sean P Gramling
(74) *Attorney, Agent, or Firm* — Muncy, Geissler, Olds & Lowe, P.C.

(57) ABSTRACT

A closing element for closing a service opening in the housing of a headlamp, and a method therefor, the closing element having a ventilation component, with the aid of which a gas exchange between an inside and an outside of the housing of the headlamp is facilitated. The closing element includes a sealing formation, on which a sealing member may be arranged or is arranged, so that the ventilation component may be or is temporarily closed with the aid of the sealing member.

9 Claims, 2 Drawing Sheets

(56) References Cited

FOREIGN PATENT DOCUMENTS

KR        101348260 B1    1/2014
KR    20150145826 A   12/2015

* cited by examiner

CLOSURE ELEMENT FOR CLOSING THE HOUSING OF A HEADLAMP

This nonprovisional application is a continuation of International Application No. PCT/EP2017/073100, which was filed on Sep. 14, 2017, and which claims priority to German Patent Application No. 10 2016 117 692.3, which was filed in Germany on Sep. 20, 2016, and which are both herein incorporated by reference.

BACKGROUND OF THE INVENTION

Field of the Invention

The present invention relates to a closing element for closing a service opening in the housing of a headlamp, the closing element having a ventilation component, with the aid of which a gas exchange between an inside and an outside of the housing of the headlamp is facilitated. The invention also relates to a method for temporarily closing the service opening in the housing of the headlamp with the aid of the closing element according to the invention.

Description of the Background Art

A closing element for closing a service opening in the housing of a headlamp is known, for example, from DE 196 32 909 A1. If an illuminant must be replaced, the closing element may be removed from the service opening to make the inside of the housing accessible.

To ventilate the housing of the headlamp, it is known to provide ventilation component in the housing, which may also be integrated, in particular, into the closing element. DE 10 2014 118 740 A1 shows one example of a ventilation unit. To accommodate a filter element, a complex geometry of the carrier body for arranging the filter element is needed to avoid the penetration of moisture and contaminants into the interior of the housing of the headlamp.

Newer ventilation component may be formed from microporous membranes, which are available under the trade name, Gore-Tex. The ventilation capability, with a simultaneously water-impermeable and dirt-repellent property, is particularly characteristic. The inside of the housing may thus be ventilated with the outside, while the penetration of moisture and contaminants is avoided by the correspondingly designed ventilation component.

To test the tightness of a headlamp housing, it is necessary to temporarily close ventilation component of this type. For example, the housing is pressurized on the inside for this purpose, or a vacuum is produced, to measure a corresponding change in pressure over a measuring period. To avoid a corruption of the tightness of the closing element in the service opening of the housing, it is furthermore necessary to leave the closing element in an inherently common arrangement in the service opening, without the closing element being pressed, for example by a sealing member, into the glue joint used to insert the closing element into the service opening. If a leak were to be present in the joint between the closing element and the service opening of the housing without the application of force, this leak may be temporarily closed by pressing the closing element into the glue joint. This consequently results in a corrupted result, so that the goal is to temporarily close the ventilation component in the closing element for the tightness test, without the closing element being pressed into the glue joint of the service element by the application of external forces.

SUMMARY OF THE INVENTION

It is therefore an object of the present invention to provide. a closing element such that the ventilation component introduced into the closing element may be temporarily closed without force for a tightness test of the headlamp.

The invention covers the technical teaching that the closing element includes a sealing formation, on which a sealing member may be arranged, so that the ventilation component may be temporarily closed with the aid of a seal.

In an exemplary embodiment, a core of the invention is to refine the closing element with a sealing formation in such a way that the sealing member may be mounted on the sealing formation or inserted thereinto for the purpose of closing the ventilation component. The sealing member may be disposed on the closing element in a self-retaining manner, so that no external force must be applied to the closing element, either manually or using a handling system, so that also no forces are applied to the glue joint between the closing element and the housing. The sealing system between the closing element in the service opening and the housing does not absolutely have to include a glue joint and may also be designed, for example, as another sealing element.

The sealing formation can be formed on the outside of the closing element. The sealing formation may have a closed contour which surrounds the ventilation component. It is particularly advantageous if the sealing formation is designed as a single piece with the closing element and forms a collar, which projects out of the essentially planar extension of the closing element on the outside. The closing element forms, for example, a cap or a plate-shaped element for closing the service opening, and the collar-shaped sealing formation juts out to the outside. The ventilation component is arranged within the closed collar of the sealing formation. When a sealing member is inserted into the sealing formation, the sealing member closes the ventilation component. The ventilation component is designed, for example, as a microporous membrane, in particular including the material Gore-Tex.

For example, the sealing formation forms an annular collar having an essentially cylindrical inner surface. In a complementary design thereto, the sealing member may have a cylindrical circumferential contour, at least in sections, with the aid of which the sealing member is inserted into the inner surface of the sealing formation. The outer contour of the sealing member further advantageously includes sealing rings, which form a seal against the inner surface of the sealing formation when the sealing member is inserted into the sealing formation. The sealing member may include a grip or a formation for handling purposes, with the aid of which the sealing member is inserted into the sealing formation from an insertion direction. One advantage of an annular design of the collar for the sealing formation arises due to the fact that the sealing member may have a rotationally symmetrical design, whereby the manufacturing is simplified.

The invention is also directed to a method for temporarily closing a service opening in the housing of a headlamp, which includes a closing element, the closing element having a ventilation component, with the aid of which a gas exchange between the inside and the outside of the housing of the headlamp is facilitated, the method comprising at least the following steps: Providing a closing element, which includes a sealing formation, and arranging a sealing member on the sealing formation, whereby the ventilation component is temporarily closed without force with the aid of the sealing member.

An advantage of the method, using the sealing member arranged on the sealing formation, is the lack of force with which the sealing member is arranged on the sealing formation, in particular in a self-retaining manner. As a result, the closing element is not pressed into the service opening of the housing of the headlamp to achieve the sealing effect for sealing the ventilation component. Once the tightness test has taken place, the sealing member may be removed again from the sealing formation.

The method is particularly advantageously carried out in such a way that the sealing formation projects in the manner of a collar from the outside of the sealing element, and the sealing member is arranged against an inner surface of the sealing formation in a self-retaining manner, forming a radial force. Radial forces may cancel each other out in and of themselves in the case of a closed sealing contour, so that no external force is applied to the connection of the closing element to the housing. At most, the weight force of the sealing member additional acts upon the closing element as force, so that it is advantageous to manufacture the sealing member from a very lightweight material, for example from a plastic, in particular with a high design of the body.

It is furthermore advantageous if the sealing member includes sealing rings, with the aid of which the sealing effect against the inner surface of the sealing formation is achieved. Upon an application of gas pressure, or in the case of a vacuum, it is important to preferably completely achieve the sealing effect of the sealing member in the seal formation, so that the result of the tightness test is not corrupted.

The sealing member is also arranged manually or using a handling system of a sealing formation, the arrangement being, in particular, self-retaining and thus taking place perpendicularly to the extension plane of the closing element without axial force. The arrangement thus takes place, in particular without axial force, in the insertion direction for inserting the seal formation into the inner surface of the sealing member.

The method is used, in particular, to arrange the sealing member on the sealing formation for the purpose of closing the ventilation component during a tightness test of the headlamp. Once the tightness test is completed, the sealing member may be removed again from the sealing formation, and the ventilation effect of the ventilation component in the closing element may be used to operate the headlamp.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
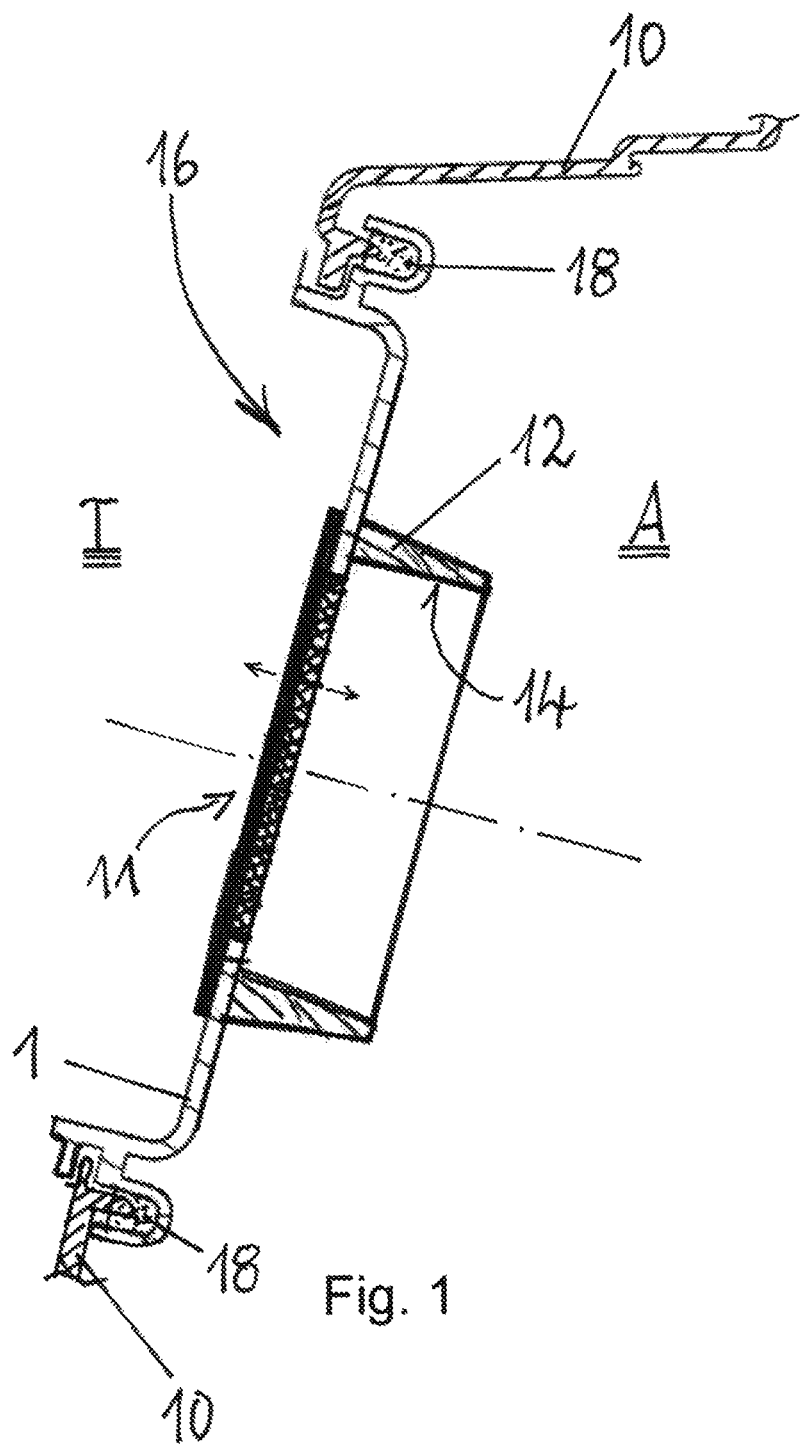
FIG. 1 shows a cross-sectional view of the housing of the headlamp, including the service opening, in which a closing element including the sealing formation according to the invention is arranged.
Figure 2:
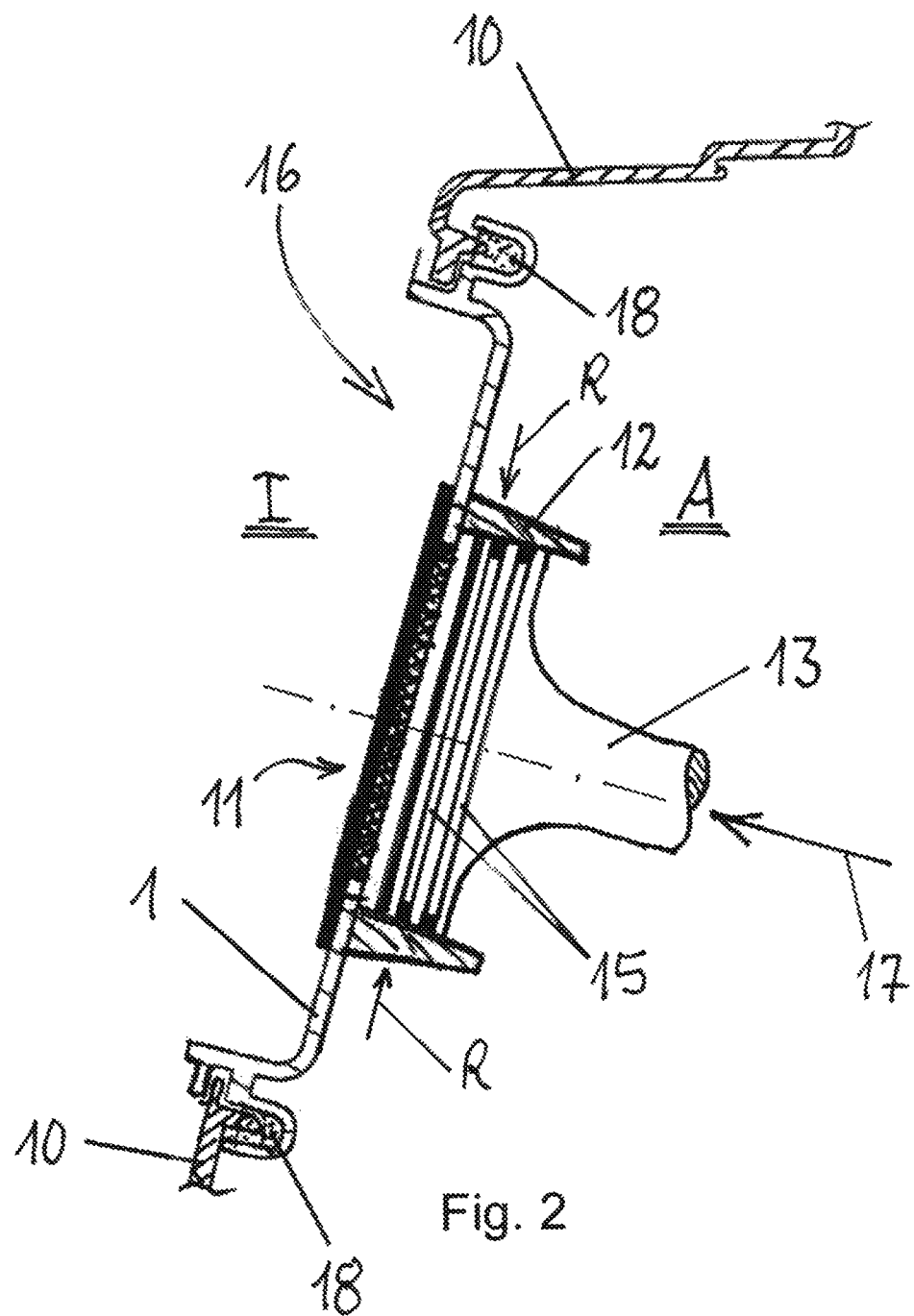
FIG. 2 shows the view according to FIG. 1, a sealing member being inserted into the sealing formation for the purpose of temporarily closing the ventilation component in the closing element.

FIGS. 1 and 2 shows a cross-sectional view of housing 10 of a headlamp for a vehicle. A closing element 1 is inserted into service opening 16 in housing 10. A glue joint 18, which has a closed, circumferential contour around service opening 16, accommodates closing element 1 gas-tight in housing 10.

Closing element 1 has ventilation component 11, formed, for example, by a microporous membrane, in particular Gore-Tex, to facilitate a ventilation between inside I and outside A of housing 10, the ventilation being indicated by arrows in FIG. 1. Closing element 1 has a sealing formation 12 on outside A. Sealing formation 12 is provided with a collar-like design and surrounds ventilation component 11 in an annular manner. A fully circumferential inner surface 14 results thereby, into which a sealing member 13 may be arranged in a self-retaining manner, as illustrated in detail in FIG. 2.

FIG. 2 shows the arrangement of sealing member 13 of sealing formation 12. Sealing member 13 may be arranged pressure-tight against inner surface 14 of sealing formation 12 with the aid of sealing rings 15. If a pressure difference exists between inside I and outside A of housing 10 of the headlamp, a gas exchange may thus be prevented by ventilation component 11.

If sealing member 13 is inserted into sealing formation 12 from illustrated insertion direction 17, a self-retaining arrangement of sealing member 13 results by the application of a radial force R, so that sealing rings 15 effectively form a seal against inner surface 14 with a slight negative allowance. For the tightness test, sealing member 13 is, for example, released or detached by a handling system to preferably generate a force-free arrangement without the application of force in insertion direction 17. An arrangement of closing element 1 in glue joint 18 of housing 10 is established thereby, which is not distinguished from the later operation of the headlamp. A holding force is thereby avoided to press a sealing member 13 against ventilation component 11 for the purpose of making the latter temporarily gas-impermeable. This holding force would corrupt the tightness of glue joint 18, which disadvantage is overcome by the design according to the invention of closing element 1 and by the method according to the invention.

Glue joint 18 may also be designed as a sealing unit including, for example, a sealing tape or the like.

The design of the invention is not limited to the preferred exemplary embodiment specified above. Instead, a number of variants are conceivable, which make use of the illustrated approach, even in fundamentally different designs. All features and/or advantages arising from the claims, the description or the drawings, including structural details, spatial arrangements and method steps, may be essential to the invention individually as well as in a wide range of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closing element for closing a service opening in a housing of a headlamp, the closing element comprising:
   a ventilation component via which a gas exchange between an inside and an outside of the housing of the headlamp is facilitated; and
   a sealing formation on which a sealing member is arranged so that the ventilation component is adapted to be temporarily closed via the sealing member,
   wherein the sealing formation is formed as a collar that projects from an outer surface of the closing element, and
   wherein the sealing member is disposed in a self-retaining manner against an inner surface of the sealing formation forming a radial force.

2. The closing element according to claim 1, wherein the sealing formation has a closed contour, which surrounds the ventilation component.

3. The closing element according to claim 1, wherein the sealing formation is designed as a single piece with the closing element and the outer surface of the closing element, from which the sealing formation projects, is planar.

4. The closing element according to claim 1, wherein the collar that forms the sealing formation is an annular collar having an essentially cylindrical inner surface.

5. The closing element according to claim 1, wherein the sealing member includes sealing rings, which are brought into contact in a sealing manner against the inner surface of the sealing formation.

6. A method for temporarily closing a service opening in a housing of a headlamp, the method comprising:
   providing a closing element which includes a sealing formation, the closing element having a ventilation component, with the aid of which a gas exchange between an inside and an outside of the housing of the headlamp is facilitated; and
   arranging a sealing member on the sealing formation, wherein the ventilation component is temporarily closed without force by the sealing member,
   wherein the sealing formation is formed as a collar that projects from an outer surface of the closing element, and wherein the sealing member is disposed in a self-retaining manner against an inner surface of the sealing formation forming a radial force.

7. The method according to claim 6, wherein the sealing member includes sealing rings, which are brought into contact in a sealing manner against the inner surface of the sealing formation.

8. The method according to claim 6, wherein the sealing member is arranged on the sealing formation manually or using a handling system, the arrangement being self-retaining and thus taking place perpendicularly to an extension plane of the closing element without axial force.

9. The method according to claim 6, wherein the sealing member is arranged on the sealing formation for closing the ventilation component during a tightness test of the headlamp.

* * * * *